Figure 1:
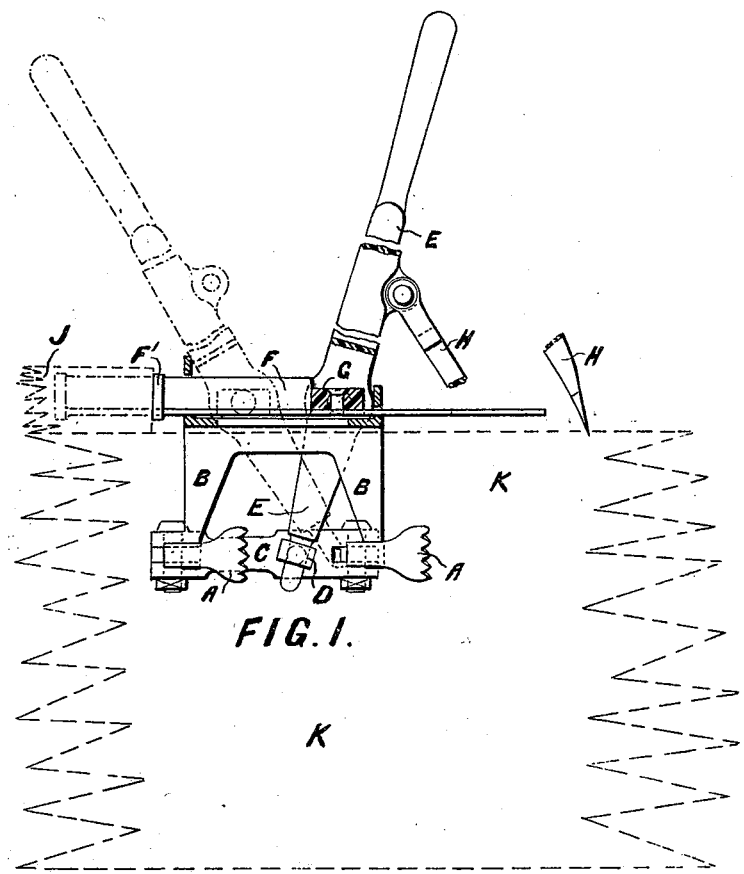

No. 648,013. Patented Apr. 24, 1900.
J. WOODHEAD.
CRAMP.
(Application filed Sept. 15, 1899.)
(No Model.) 2 Sheets—Sheet 1.

WITNESSES
Ella L. Giles

INVENTOR
Joseph Woodhead
BY Richards
ATTORNEYS

No. 648,013. Patented Apr. 24, 1900.
J. WOODHEAD.
CRAMP.
(Application filed Sept. 15, 1899.)
(No Model.) 2 Sheets—Sheet 2.
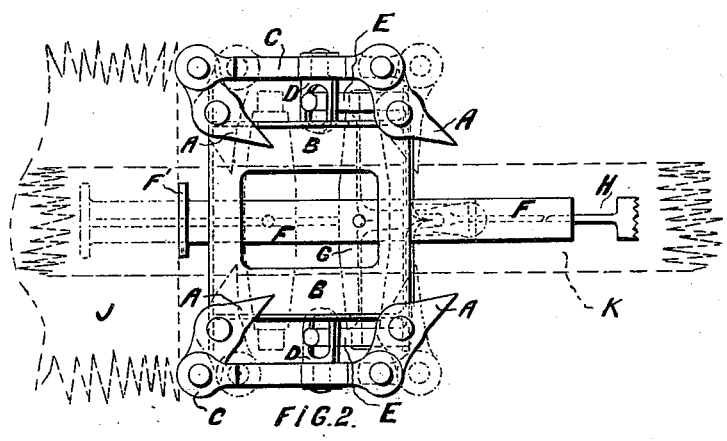
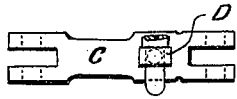
FIG.3.
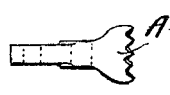
FIG.5.
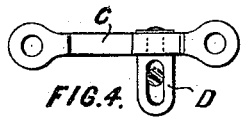
FIG.4.
FIG.6.
WITNESSES:
Ella L. Giles
INVENTOR
Joseph Woodhead
ATTORNEYS

UNITED STATES PATENT OFFICE.

JOSEPH WOODHEAD, OF SOUTH BRISBANE, QUEENSLAND.

CRAMP.

SPECIFICATION forming part of Letters Patent No. 648,013, dated April 24, 1900.

Application filed September 15, 1899. Serial No. 730,626. (No model.)

*To all whom it may concern:*

Be it known that I, JOSEPH WOODHEAD, engineer, residing at Boggo road, South Brisbane, Queensland, have invented certain new and useful Improvements in Cramps; and I do hereby declare the following to be a full, clear, and exact description of the invention, such as will enable others skilled in the art to which it appertains to make and use the same.

My invention relates to that class of flooring-cramp that is operated by the direct action of one lever; and it has for its object the production of a cramp that when placed in position first grips the joist (or its equivalent) and afterward cramps up the work.

My invention consists of a lever articulated in such a manner that at first it acts as a lever of the first order when gripping the joist and after that object is attained it operates as a lever of the second order when cramping up the work.

The cramp constructed in accordance with my invention consists of a saddle-frame substantially rectangular in plan, but U-shaped in elevation, having four inverted bearing-pins at the four corners thereof, each of which carries a short lever having one end formed with teeth to grip the joist, while the other end is connected to a similar lever on the same side of the saddle. On the top of the saddle, working in suitable grooves or slides, is a ram pivoted to a bifurcated lever, while the lower ends of this lever are stepped into slotted links pivoted to the couplers connecting each short lever on either side. In order, however, that the invention may be clearly understood, I will now describe it with reference to the accompanying drawings, in which—

Figure 1 is a side view of my invention with part of the saddle-frame shown in section. Fig. 2 is a bottom of same. Fig. 3 is a detail view of the coupler with the end of the lever shown broken off. Fig. 4 is a plan of same. Fig. 5 is a side view of the short levers. Fig. 6 is a plan of same.

A A are the short levers, provided at one end with sharp teeth to enable them to grip the joist K, studs, &c. Each lever is pivoted to one of the terminals of the saddle-frame B. Each short lever on one side is connected to the corresponding one on the same side by a coupler C. In each coupler C is pivotally connected a slotted link D, made to receive the lower ends of the bifurcated lever E.

On the top of the frame B, working in suitable slides or slots, is the ram F, connected to the bifurcated lever E by the cross-bar G.

The stay H is provided to hold the cramp in position while the boards are being secured.

The whole of the cramp may be made of malleable cast-iron or other suitable material and made in sizes to suit the various uses to which it may be put, such as flooring or ceiling joists, walls, studs, &c.

The method of using this cramp is as follows: The operator places the cramp over the joist K with the ram facing him and close against the boards to be cramped up. Then on pulling the lever toward him, the ram-head being against the boards J, the cross-bar G becomes the fulcrum, and the movement of the lever E causes the teeth of the short levers to grip the joist K. When this grip is attained, further movement of the lever means that the ram must be moved forward, because the fulcrum is now at the lower extremity of the lever. When no further movement is possible, the stay H holds the cramp while the boards are fastened, after which the stay is removed and the lever put back. In so doing the short levers immediately release the joist, so that the cramp can be pushed back or removed to allow of more boards being placed in position.

Having now particularly described and ascertained the nature of my said invention and in what manner the same is to be performed, I declare that what I claim is—

1. In combination, a frame, a lever, a ram connected with the lever, a grip pivoted at a point intermediate of its length to the frame and having one end adapted to engage the beam, and a connection between the opposite end of the grip and the lever, substantially as described.

2. In combination, the frame, the grips pivoted thereto, the couplers connecting the grips, the lever connected to the couplers at the lower end, and the ram connected to the lever, substantially as described.

In testimony that I claim the foregoing as my invention I have signed my name in presence of two subscribing witnesses.

JOSEPH WOODHEAD.

Witnesses:
CHARLES E. BERNAYS.
ALEXANDER ANDERSON.